(12) United States Patent
Lee (10) Patent No.: US 11,799,348 B2
(45) Date of Patent: Oct. 24, 2023

(54) STEP ACTUATOR

(71) Applicant: LG INNOTEK CO., LTD., Seoul (KR)

(72) Inventor: Hong Kon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 622 days.

(21) Appl. No.: 16/855,643

(22) Filed: Apr. 22, 2020

(65) Prior Publication Data

US 2020/0251953 A1   Aug. 6, 2020

Related U.S. Application Data

(63) Continuation of application No. 15/453,419, filed on Mar. 8, 2017, now Pat. No. 10,673,299, which is a
(Continued)

(30) Foreign Application Priority Data

Jul. 28, 2008 (KR) .................. 10-2008-0073770

(51) Int. Cl.
*H02K 5/16* (2006.01)
*F16C 35/04* (2006.01)
*F16H 25/20* (2006.01)

(52) U.S. Cl.
CPC ............ *H02K 5/16* (2013.01); *F16C 35/042* (2013.01); *F16C 2380/26* (2013.01); *F16H 2025/2031* (2013.01)

(58) Field of Classification Search
CPC .......... H02K 5/16; H02K 37/14; H02K 37/24; F16C 35/042; F16C 41/004; F16H 2025/2031; F16H 2025/2078
See application file for complete search history.

(56) References Cited

U.S. PATENT DOCUMENTS 4,659,950 A   4/1987 Gotoh
5,220,224 A   6/1993 Bosman et al.
(Continued)

FOREIGN PATENT DOCUMENTS

CN   1156221 A   8/1997
CN   1945944 A   4/2007
(Continued)

OTHER PUBLICATIONS

Office Action dated Dec. 5, 2012 in Chinese Application No. 200880130873.7, filed Nov. 3, 2008.
(Continued)

*Primary Examiner* — Bobby Rushing, Jr.
(74) *Attorney, Agent, or Firm* — Saliwanchik, Lloyd & Eisenschenk (57) ABSTRACT

Disclosed is a step actuator. The step actuator includes a housing; a stator installed in the housing; a rotor positioned radially inward from the stator, the rotor rotating and protruding from one side of the housing; a bearing installed at one side of the housing so as to be coupled with the rotor; a bearing cover coupled with one side of the housing to restrain movement of the bearing; a screw member coupled with the rotor to linearly move according to rotation of the rotor; and a mounting member coupled to the bearing cover to support the screw member.

15 Claims, 11 Drawing Sheets

Related U.S. Application Data continuation of application No. 14/204,699, filed on Mar. 11, 2014, now Pat. No. 9,625,016, which is a continuation of application No. 13/056,455, filed as application No. PCT/KR2008/006474 on Nov. 3, 2008, now Pat. No. 8,978,496.

(56) References Cited

U.S. PATENT DOCUMENTS

| | | | |
|---|---|---|---|
| 5,351,935 A | 10/1994 | Miyoshi et al. | |
| 5,497,039 A | 3/1996 | Blaettner et al. | |
| 5,784,922 A | 7/1998 | Ozaki et al. | |
| 5,845,390 A | 12/1998 | Cheng et al. | |
| 6,224,034 B1 * | 5/2001 | Kato | H02K 7/06 251/129.13 |
| 6,376,947 B1 | 4/2002 | Tateishi | |
| 6,431,826 B1 | 8/2002 | Schober | |
| 6,473,958 B2 | 11/2002 | Miyoshi et al. | |
| 6,641,292 B2 | 11/2003 | Miki et al. | |
| 6,849,974 B2 | 2/2005 | Howe et al. | |
| 6,888,277 B2 | 5/2005 | Watzek et al. | |
| 7,151,333 B2 | 12/2006 | Suzuki et al. | |
| 7,210,665 B2 | 5/2007 | Suzuki et al. | |
| 7,378,768 B2 | 5/2008 | Ohkawa et al. | |
| 7,389,709 B2 * | 6/2008 | Zhou | F16H 25/2204 74/89.32 |
| 7,408,277 B1 | 8/2008 | Huang | |
| 8,026,641 B2 | 9/2011 | Lee | |
| 8,567,272 B2 | 10/2013 | Hyun | |
| 8,978,496 B2 | 3/2015 | Lee | |
| 9,172,285 B2 | 10/2015 | Won | |
| 9,625,016 B2 | 4/2017 | Lee | |
| 2002/0043880 A1 | 4/2002 | Suzuki et al. | |
| 2004/0007936 A1 | 1/2004 | Cros et al. | |
| 2004/0060149 A1 | 4/2004 | Chang | |
| 2004/0164624 A1 | 8/2004 | Suzuki et al. | |
| 2005/0264113 A1 | 12/2005 | Suzuki et al. | |
| 2005/0275297 A1 | 12/2005 | Suzuki et al. | |
| 2006/0033400 A1 | 2/2006 | Totsu et al. | |
| 2006/0186742 A1 | 8/2006 | Miyawaki | |
| 2007/0138901 A1 | 6/2007 | Bin | |
| 2007/0222329 A1 | 9/2007 | Bin | |
| 2007/0274002 A1 | 11/2007 | Kim et al. | |
| 2008/0042525 A1 | 2/2008 | Shin et al. | |
| 2008/0084125 A1 | 4/2008 | Ohkawa et al. | |
| 2008/0093942 A1 | 4/2008 | Huang | |
| 2008/0164784 A1 | 7/2008 | Huang | |
| 2009/0249908 A1 | 10/2009 | Kovacic et al. | |
| 2011/0132115 A1 | 6/2011 | Lee | |
| 2012/0019082 A1 | 1/2012 | Won | |
| 2014/0026696 A1 | 1/2014 | Hyun | |

FOREIGN PATENT DOCUMENTS

| | | |
|---|---|---|
| CN | 101079560 A | 11/2007 |
| CN | 101127476 A | 2/2008 |
| CN | 101220855 A | 7/2008 |
| EP | 1-453-184 A1 | 9/2004 |
| EP | 1-608-052 A2 | 12/2005 |
| EP | 1-890-375 A2 | 2/2008 |
| JP | 62-132267 U | 8/1987 |
| JP | H0233571 U | 3/1990 |
| JP | 07-027023 | 1/1995 |
| JP | H08051755 A | 2/1996 |
| JP | 08-266035 A | 10/1996 |
| JP | H-10-84663 A | 3/1998 |
| JP | 10-322963 A | 12/1998 |
| JP | H11155275 A | 6/1999 |
| JP | 2002-084709 A | 3/2002 |
| JP | 2005-117752 A | 4/2005 |
| JP | 2005-287288 A | 10/2005 |
| JP | 2006-174581 A | 6/2006 |
| JP | 2006-197713 A | 7/2006 |
| JP | 2007116763 A | 5/2007 |
| JP | 2007-159182 | 6/2007 |
| JP | 2011-529678 A | 12/2011 |
| KR | 10-2005-0074015 A | 7/2005 |

OTHER PUBLICATIONS

Office Action dated Jun. 8, 2013 in Chinese Application No. 200880130873.7, filed Nov. 3, 2008.
European Search Report in European Application No. 08-87-6666, dated Jan. 21, 2014.
Office Action dated Dec. 16, 2013 in Chinese Application No. 200880130873.7.
Office Action dated May 28, 2012 in Japanese Application No. 2011-521006, filed Nov. 3, 2008.
Office Action dated Jun. 26, 2014 in Korean Application No. 10-2008-0073770.
Office Action dated Sep. 16, 2014 in Japanese Application No. 2013-203071.
Office Action dated Jun. 14, 2016 in Japanese Application No. 2015-107900.
Office Action dated Dec. 20, 2016 in Japanese Application No. 2015-107900.
Office Action dated Jul. 4, 2017 in Japanese Application No. 2016-171859.
Office Action dated Jul. 7, 2017 in Chinese Application No. 2015-10205203.9.
Chinese Office Action dated Jan. 14, 2019 in Chinese Application No. 201710866722.9.
Restriction Requirement dated May 2, 2013 in U.S. Appl. No. 13/056,455.
Office Action dated Jul. 24, 2014 in U.S. Appl. No. 13/056,455.
Office Action dated Jul. 1, 2013 in U.S. Appl. No. 13/056,455.
Office Action dated Oct. 24, 2013 in U.S. Appl. No. 13/056,455.
Office Action dated Feb. 27, 2014 in U.S. Appl. No. 13/056,455.
Notice of Allowance dated Oct. 31, 2014 in U.S. Appl. No. 13/056,455.
Office Action dated Jun. 3, 2016 in U.S. Appl. No. 14/204,699.
Notice of Allowance dated Dec. 8, 2016 in U.S. Appl. No. 14/204,699.
Restriction Requirement dated Oct. 10, 2018 in U.S. Appl. No. 15/453,419.
Office Action dated Mar. 6, 2019 in U.S. Appl. No. 15/453,419.
Ex parte Quayle Action dated Sep. 19, 2019 in U.S. Appl. No. 15/453,419.
Notice of Allowance dated Jan. 29, 2019 in U.S. Appl. No. 15/453,419.

* cited by examiner

STEP ACTUATOR

CROSS-REFERENCE TO RELATED APPLICATIONS

This application is a continuation of U.S. application Ser. No. 15/453,419, filed Mar. 8, 2017; which is a continuation of U.S. application Ser. No. 14/204,699, filed Mar. 11, 2014, now U.S. Pat. No. 9,625,016, issued Apr. 18, 2017; which is a continuation of U.S. application Ser. No. 13/056,455, filed Feb. 1, 2011, now U.S. Pat. No. 8,978,496, issued Mar. 17, 2015; which is the U.S. National Stage Application of International Patent Application No. PCT/KR2008/006474, filed Nov. 3, 2008; which claims the benefit under 35 U.S.C. § 119 of Korean Patent Application No. 10-2008-0073770, filed on Jul. 28, 2008, all of which are herein incorporated by reference in their entirety.

TECHNICAL FIELD

The embodiment relates to a step actuator.

BACKGROUND ART

A step actuator includes a rotor and a stator. The step actuator linearly drives a shaft according to rotation of the rotor.

For instance, the step actuator is connected to a member, which drives a reflector of a vehicle headlight system, in order to change the direction of illumination. In addition, the step actuator converts the rotational movement of the rotor into the linear movement, so the step actuator can be applied to various electric and mechanical devices requiring the linear action.

DISCLOSURE

Technical Problem

The embodiment provides a step actuator having a novel structure.

The embodiment provides a step actuator including a bearing cover for restraining a bearing, and a mounting member coupled to the bearing cover to support a screw member.

The embodiment provides a step actuator including a bearing cover detachably coupled to a mounting member.

The embodiment provides a step actuator including a bearing cover which can be easily coupled to a mounting member.

Technical Solution

A step actuator according to an embodiment includes a housing; a stator installed in the housing; a rotor positioned radially inward from the stator, the rotor rotating and protruding from one side of the housing; a bearing installed at one side of the housing so as to be coupled with the rotor; a bearing cover coupled with one side of the housing to restrain movement of the bearing; a screw member coupled with the rotor to linearly move according to rotation of the rotor; and a mounting member coupled to the bearing cover to support the screw member.

A step actuator according to an embodiment includes a housing; a stator installed in the housing; a rotor positioned radially inward from the stator, the rotor rotating and protruding from one side of the housing; a bearing installed at one side of the housing so as to be coupled with the rotor; a bearing cover coupled with one side of the housing to restrain movement of the bearing; a screw member coupled with the rotor to linearly move in a first direction and a second direction, which is opposite to the first direction, according to rotation of the rotor; and a mounting member detachably coupled to the bearing cover to support the screw member.

Advantageous Effects

The embodiment can provide a step actuator having a novel structure.

The embodiment can provide a step actuator including a bearing cover for restraining a bearing, and a mounting member coupled to the bearing cover to support a screw member.

The embodiment can provide a step actuator including a bearing cover detachably coupled to a mounting member.

The embodiment can provide a step actuator including a bearing cover which can be easily coupled to a mounting member.

MODE FOR INVENTION

Hereinafter, a step actuator according to embodiments will be described in detail with reference to the accompanying drawings.

In the drawings, the size and thickness of elements are exaggerated, omitted or simplified for the purpose of convenience or clarity of explanation. In addition, the elements may have sizes different from those shown in drawings, in practice.

Figure 1:
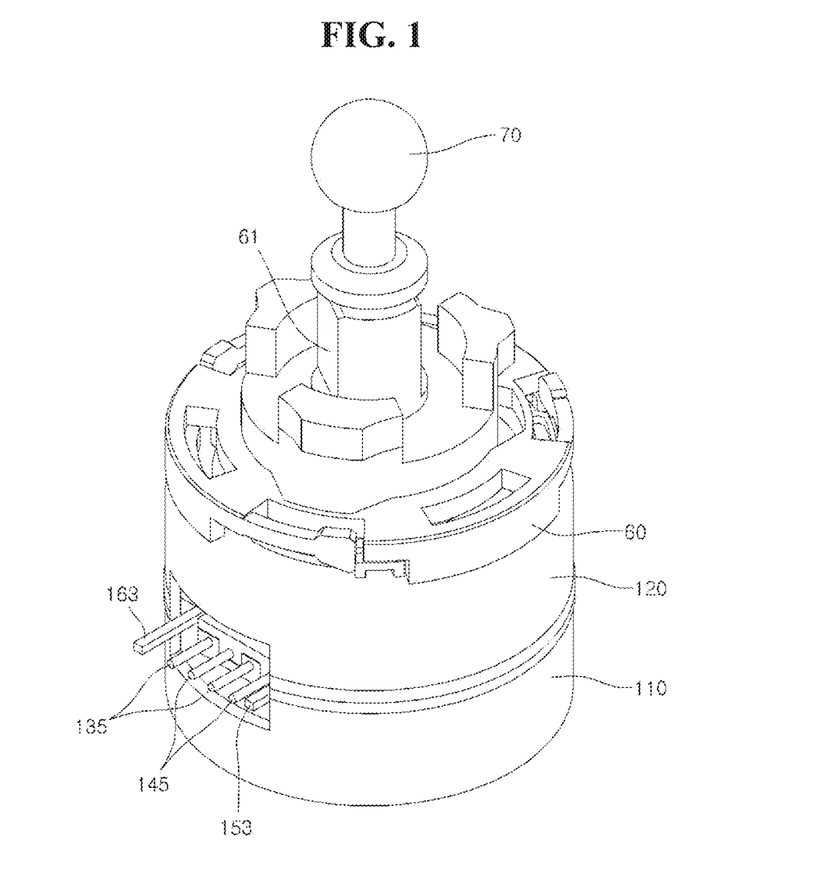
FIG. 1 is a perspective view showing a step actuator according to an embodiment.
Figure 2:
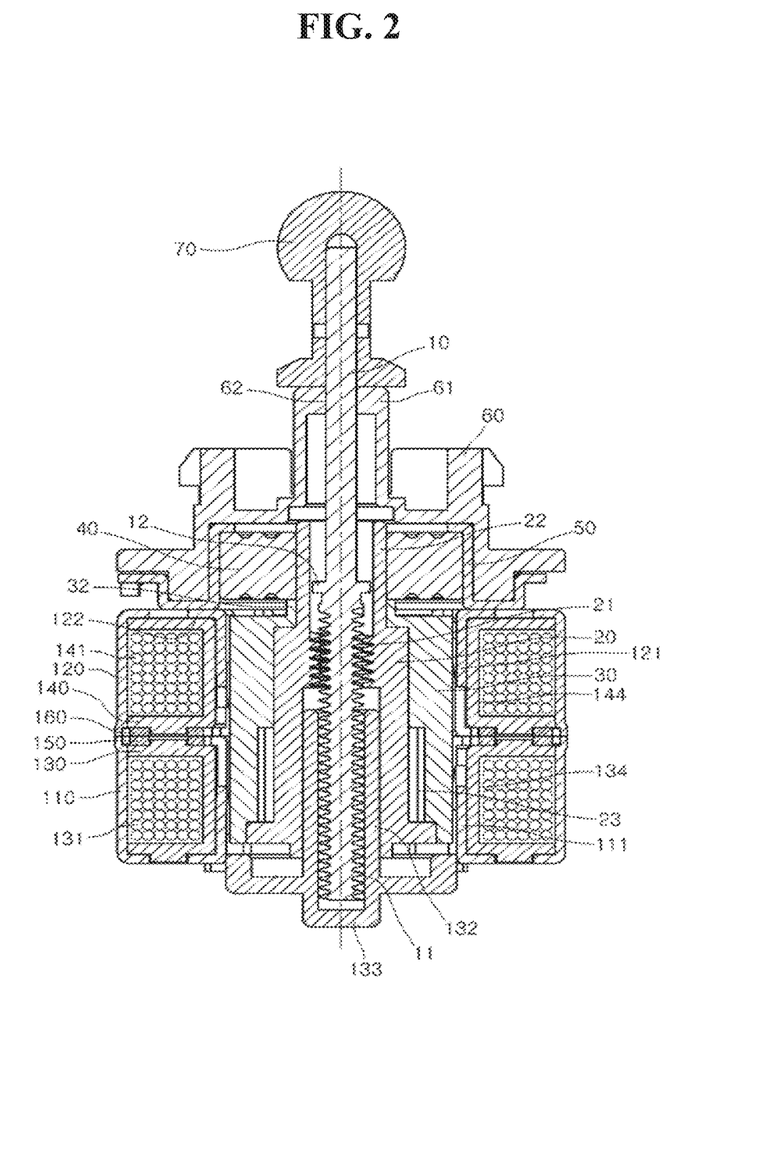
FIG. 2 is a sectional view showing a step actuator according to an embodiment.
Figure 3:
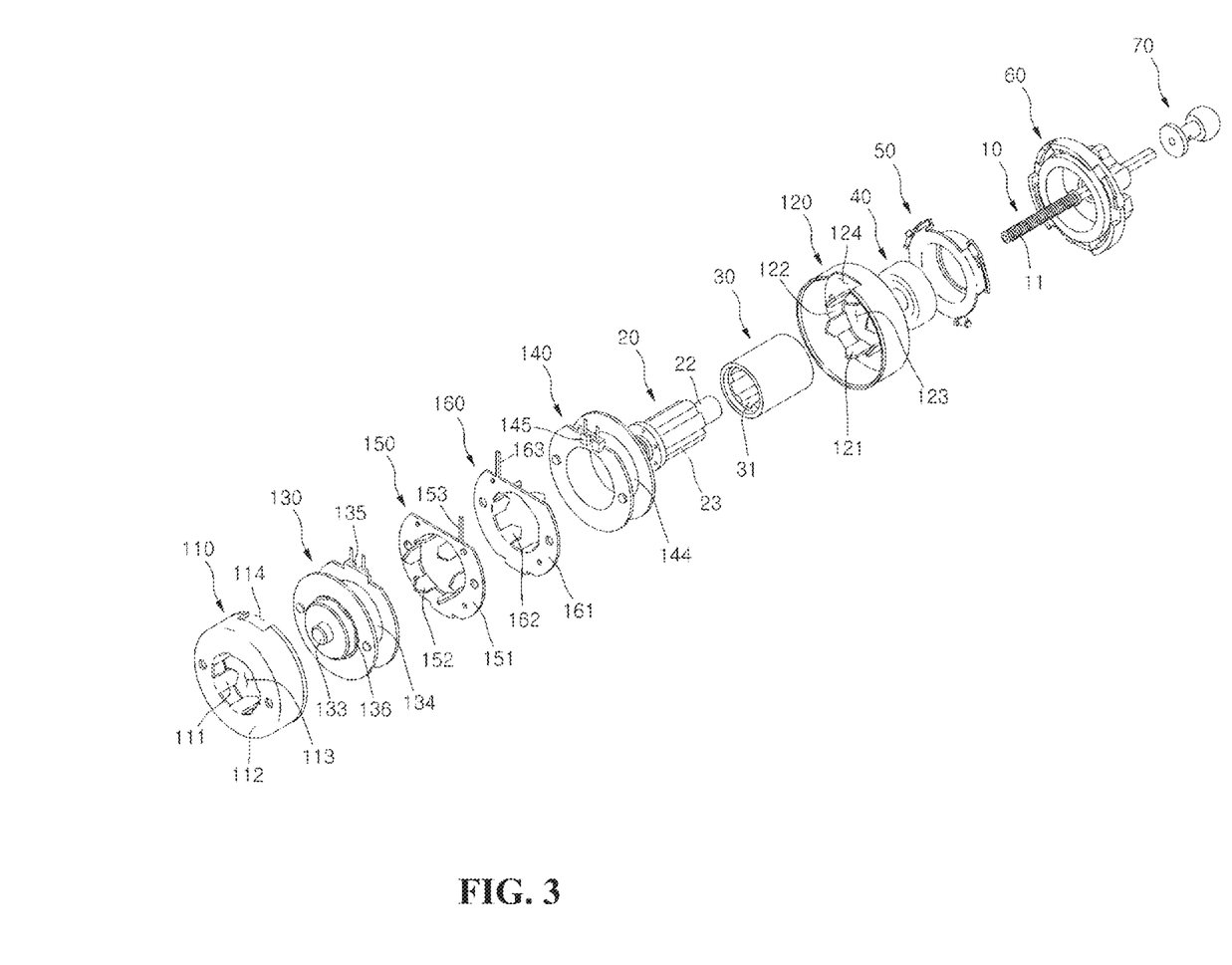
FIGS. 3 and 4 are exploded perspective views showing a step actuator according to an embodiment.
Figure 4:
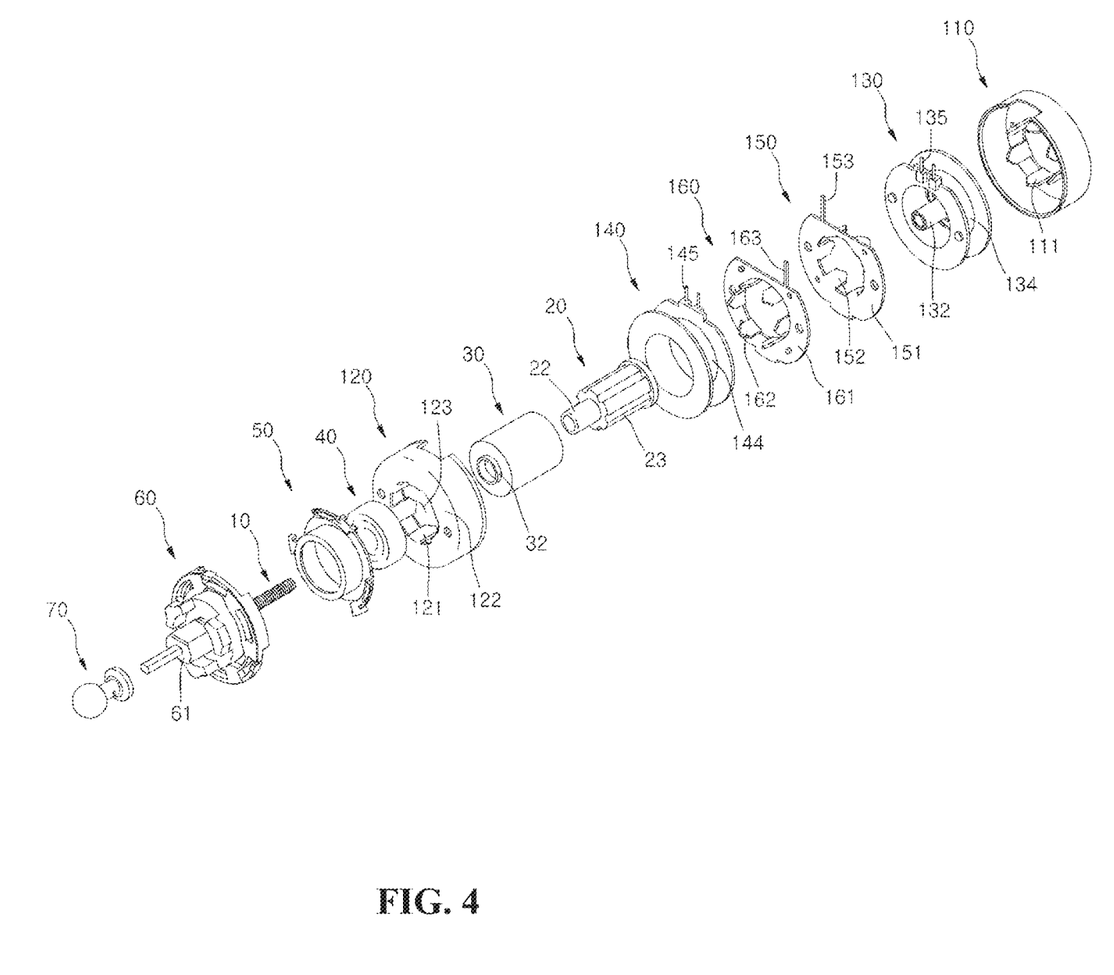

FIG. 1 is a perspective view showing a step actuator according to an embodiment, FIG. 2 is a sectional view showing the step actuator according to an embodiment, and FIGS. 3 and 4 are exploded perspective views showing a step actuator according to an embodiment.

Referring to FIGS. 1 to 4, the step actuator according to an embodiment includes a stator, a rotor that rotates while interacting with the stator, and a screw member 10 coupled to the rotor to linearly reciprocate in the first and second directions according to forward and reverse rotation of the rotor.

The stator includes first and second bobbins 130 and 140, and first and second yokes 150 and 160 installed between first and second housings 110 and 120.

The rotor includes a magnet 30 installed within the stator to rotate while interacting with the stator, and a nut member 20 (which can be referred to as a motion transmission member) coupled to the magnet 30. The screw member 10 and the nut member 20 are coupled to each other in the form of a bolt-nut assembly. Thus, if the nut member 20 rotates, the screw member 10 linearly moves.

In detail, the first and second bobbins 130 and 140 are installed in a space formed between the first and second housing 110 and 120, and the first and second yokes 150 and 160 are disposed between the first and second bobbins 130 and 140.

In addition, the magnet 30, the nut member 20 and the screw member 10 are disposed radially inward between the first and second bobbins 130 and 140.

In addition, a bearing 40, a bearing cover 50, and a mounting member 60 (which can also be referred to as a bracket) are installed at one side of the second housing 120.

In more detail, as the step actuator according to the embodiment operates, the screw member 10 linearly reciprocates in the first and second directions, which are opposite to each other, along an axis of the screw member 10.

In addition, a first end of the screw member 10 is inserted into a protrusion pipe 132 of the first bobbin 130 and a second end of the screw member 10 passes through a protrusion 61 of the mounting member 60. A joint 70 is coupled to the second end of the screw member 10.

A thread 11 is formed on an outer surface of the first end of the screw member 10, and a stopper 12 is provided between the thread 11 and the second end of the screw member 10.

The thread 11 of the screw member 10 is coupled with a thread 21 formed on an inner surface of the nut member 20. Thus, the screw member 10 moves in the first or second direction as the nut member 20 rotates.

The stopper 12 restrains the movement of the screw member 10 in the second direction. As the screw member 10 moves in the second direction, the stopper 12 is blocked by the protrusion 61 of the mounting member 60, so that the screw member 10 cannot move in the second direction any more. In addition, a blocking section 133 is provided at a first end of the protrusion pipe 132 of the first bobbin 130 in order to restrain the movement of the screw member 10 in the first direction.

The movement of the screw member 10 in the second direction can be restrained by minimizing a diameter of a perforation hole 62 (which can be referred to as a second support tube) of the protrusion 61 of the mounting member 60 such that the thread 11 of the screw member 10 cannot pass through the protrusion 61 of the mounting member 60. In addition, the movement of the screw member 10 in the first direction can be restrained by minimizing a diameter of the first end of the protrusion pipe 132 such that the thread 11 of the screw member 10 cannot pass through the protrusion pipe 132. Therefore, the blocking part 133 and the stopper 12 can be selectively provided according to the application.

Meanwhile, as described above, the screw member 10 can linearly move in the first or second direction by passing through the mounting member 60, but the rotation of the screw member 10 is restrained. That is, the rotation of the screw member 10 is restrained by the protrusion 61 of the mounting member 60.

For instance, the second end of the screw member 10 is cut into a shape of "D" and the perforation hole 62 of the mounting member 60 has a shape corresponding to a sectional shape of the second end of the screw member 10.

Since the screw member 10 cannot rotate, the screw member 10 linearly moves in the first or second direction as the nut member 20 coupled with the screw member 10 rotates.

The nut member 20 is inserted into the magnet 30 and a second end 22 of the nut member 20 protrudes in the second direction by passing through the magnet 30. A spline 23 is provided at an outer peripheral surface of the nut member 20. The spline 23 extends in the axial direction and is coupled with a spline hole 31 formed in the magnet 30. Thus, the nut member 20 rotates together with the magnet 30. As seen in at least FIGS. 3 and 4, the nut member 20 includes a support frame formed on an outer circumferential surface of the second (upper) end 22 and a step structure on an outer circumferential surface of a central portion of the nut member 20 (where the second end 22 meets the spline 23).

The second end 22 of the nut member 20 is coupled with an inner race of the bearing 40. Thus, the nut member 20 can freely rotate while being supported by the bearing 40.

In addition, the thread 21 formed in the inner surface of the nut member 20 is coupled with the screw 11 formed on the outer surface of the screw member 10. In addition, the nut member 20 is coupled with the protrusion pipe 132 of the first bobbin 130 and rotatably supported by the protrusion pipe 132 of the first bobbin 130. That is, the inner surface of the nut member 20 makes contact with an outer surface of the protrusion pipe 132.

The magnet 30 may include a permanent magnet having N and S poles which are alternately arranged in the circumferential direction at the regular interval. As mentioned above, since the nut member 20 is inserted into the magnet 30, the nut member 20 rotates as the magnet 30 rotates.

Meanwhile, a second end 32 of the magnet 30 protrudes in the second direction so as to make contact with the inner race of the bearing 40. Thus, the magnet 30 can smoothly rotate without making contact with an outer race of the bearing 40 due to the second end 32 of the magnet 30.

The first bobbin 130 having a first coil 131 and the second bobbin 140 having a second coil 141 are installed around the magnet 30. In addition, the first and second yokes 150 and 160 are arranged between the first and second bobbins 130 and 140.

The first bobbin 130 includes a first coil winding section 134, around which the first coil 131 is wound, and a first terminal section 135 electrically connected to the first coil 131. In addition, the second bobbin 140 includes a second coil winding section 144, around which the second coil 141 is wound, and a second terminal section 145 electrically connected to the second coil 141.

As mentioned above, the first bobbin 130 has the protrusion pipe 132, into which the screw member 10 is inserted, and a slit 136, into which a third tooth 111 of the first housing 110 is inserted. The first bobbin 130 faces the magnet 30 and the nut member 20. The first bobbin 130 has a recess (not shown) to reduce friction among the first bobbin 130, the magnet 30 and the nut member 20 as the magnet 30 and the nut member 20 move in the first or second direction.

The first yoke 150 includes a first body section 151 having a ring shape, a first tooth 152 protruding from an inner peripheral surface of the first body section 151 toward the first housing 110 so as to be disposed between the first bobbin 130 and the magnet 30, and a first grounding terminal 153 for grounding the first body section 151. In addition, the second yoke 160 includes a second body section 161 having a ring shape, a second tooth 162 protruding from an inner peripheral surface of the second body section 161 toward the second housing 120 so as to be disposed between the second bobbin 140 and the magnet 30, and a second grounding terminal 163 for grounding the second body section 161.

Meanwhile, the first housing 110 is provided with the third tooth 111 protruding toward the second housing 120 so as to be disposed between the first bobbin 130 and the magnet 30 by passing through the slit 136 of the first bobbin 130. The third tooth 111 and the first tooth 152 are alternately arranged along a peripheral portion of the magnet 30.

The first housing 110 has a first rim section 112, which protrudes radially inward from the cylindrical body of the first housing 110, and the third tooth 111 extends from the first rim section 112 in the second direction. A first opening 113 is defined by the first rim section 112 and one side of the first bobbin 130 is inserted into the first opening 113.

In addition, the second housing 120 has a fourth tooth 121 protruding toward the first housing 110 so as to be disposed between the second bobbin 140 and the magnet 30. The fourth tooth 121 and the second tooth 162 are alternately arranged along a peripheral portion of the magnet 30.

The second housing 120 has a second rim section 122, which protrudes radially inward from the cylindrical body of the second housing 120, and the fourth tooth 121 extends from the second rim section 122 in the first direction.

Meanwhile, a first cutting section 114 is formed in the first housing 110 by cutting a predetermined portion of the first rim section 112, and a second cutting section 124 is formed in the second housing 120 by cutting a predetermined portion of the second rim section 122. The first and second rim sections 114 and 124 form an opening. The first terminal section 135 formed in the first bobbin 130, the first grounding terminal 153 formed in the first yoke 150, a second grounding terminal 163 formed in the second yoke 160, and the second terminal section 145 formed in the second bobbin 140 protrude outward through the opening defined by the first and second rim sections 114 and 124.

The bearing 40 is installed at the second end of the second housing 120, and the bearing cover 50 is provided to support the bearing 40. That is, the bearing cover 50 is coupled to the second housing 120 to restrain the bearing 40. For instance, the bearing cover 50 can be coupled to the second housing 120 through a spot welding or a laser welding.

As described above, the inner race of the bearing 40 makes contact with the second end 22 of the nut member 20 and is supported by the second end 22 of the nut member 20.

In addition, the movement of the bearing 40 in the first direction is restrained by the second rim section 122 of the second housing 120, and the movement of the bearing 40 in the second direction is restrained by the bearing cover 50.

The diameter of a second opening 123 defined by the second rim section 122 is larger than that of the magnet 30 and smaller than that of the bearing 40. Thus, friction may not occur between the magnet 30 and the second housing 120 and the movement of the bearing 40 in the first direction can be restrained.

Figure 5:
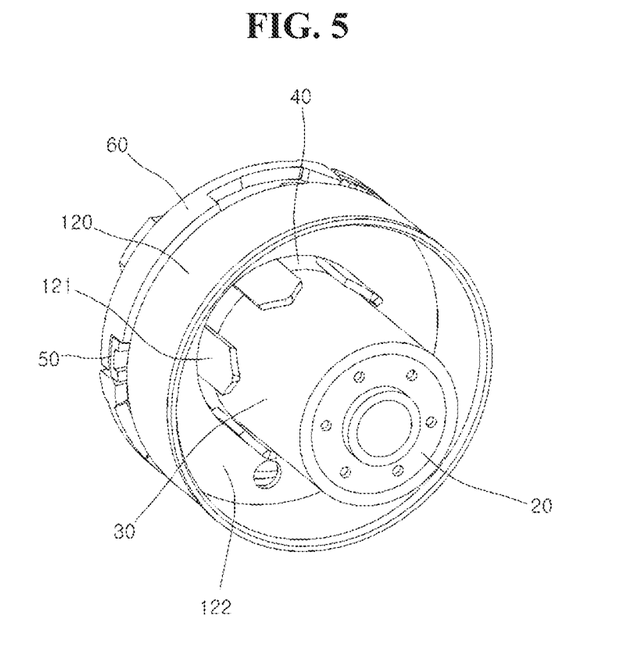
FIG. 5 is a perspective view showing a second housing that supports a bearing from the first direction in a step actuator according to an embodiment.

FIG. 5 is a perspective view showing the second housing that supports the bearing from the first direction in the step actuator according to an embodiment.

Referring to FIG. 5, the nut member 20 is inserted into the magnet 30 and is coupled with the inner race of the bearing 40.

The bearing cover 50 is coupled with the second housing 120 and the mounting member 60 is coupled with the bearing cover 50 from the second direction.

The bearing 40 is installed between the bearing cover 50 and the second housing 120. The movement of the bearing 40 in the first direction is restrained by the second rim section 122 of the second housing 120.

Referring to FIG. 5, the bearing 40 is partially exposed between the second rim section 122 and the magnet 30, and the remaining part of the bearing 40 is blocked by the second rim section 122 of the second housing 120 so that the movement of the bearing 40 in the first direction can be restrained.

Figure 6:
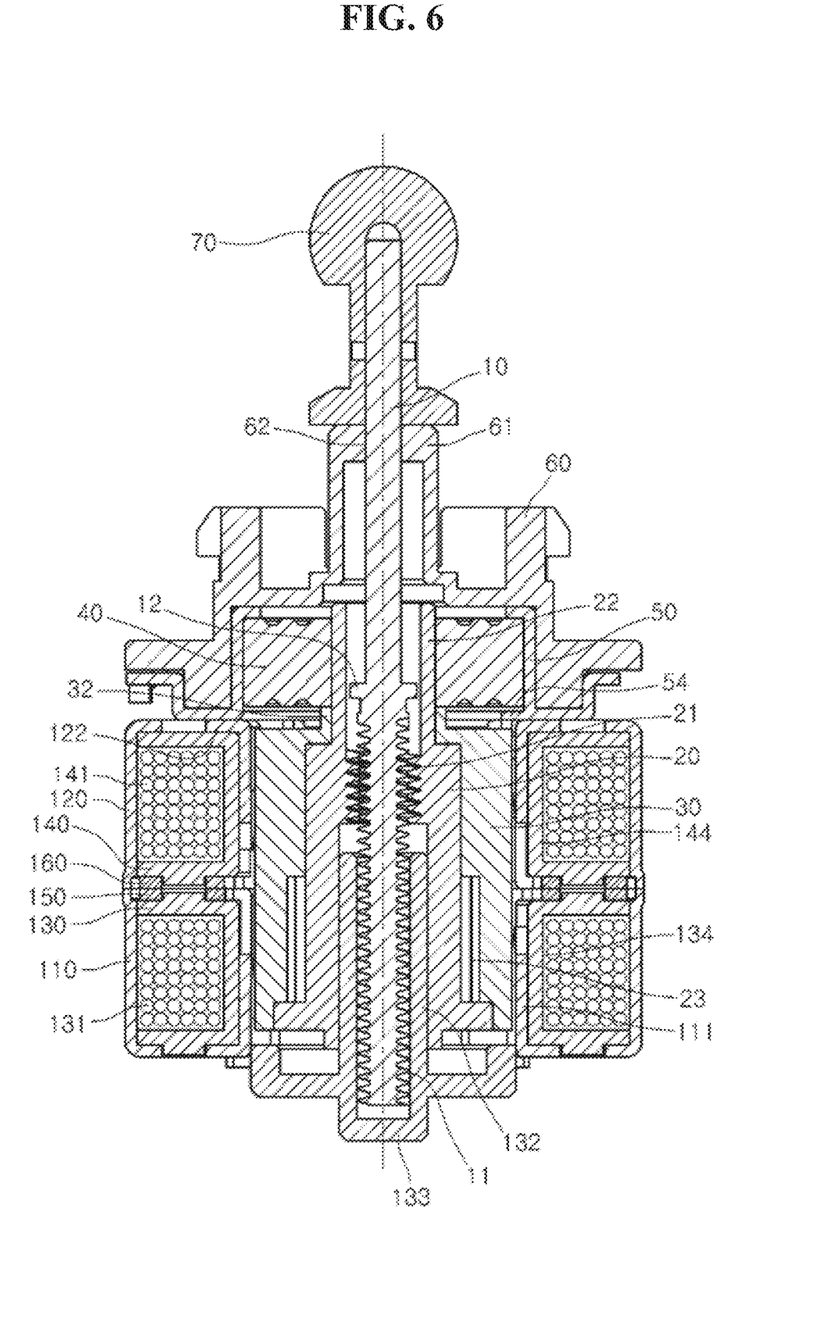
FIGS. 6 and 7 are views showing bearing covers of a step actuator according to another embodiment, respectively.
Figure 7:
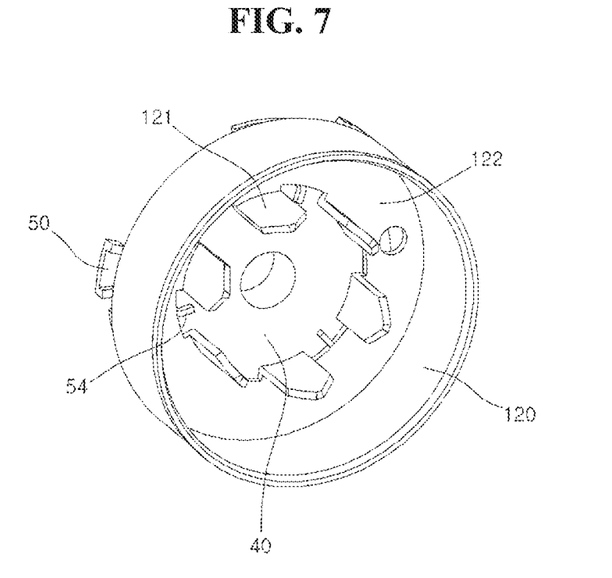

FIGS. 6 and 7 are views showing bearing covers of the step actuator according to another embodiment, respectively.

The bearing cover 50 is provided with a coupling section 54. The coupling section 54 is bent radially inward from the bearing cover 50 in order to restrain the movement of the bearing 40 in the first direction. The coupling section 54 can be aligned on an outer race of the bearing 40 through a caulking process.

Different from the step actuator shown in FIGS. 1 to 5, in which the movement of the bearing 40 in the first and second directions is restrained by the second housing 120 and the bearing cover 50, the movement of the bearing 40 in the first and second directions is restrained by the bearing cover 50 in the step actuator shown in FIGS. 6 and 7.

If the bearing 40 is restrained by the second housing 120 and the bearing cover 50 in the step actuator according to the embodiment, the mounting member 60 is not needed to restrain the bearing 40 in the specific position. Thus, the mounting member 60 can be designed in various shapes.

In addition, if the bearing 40 is restrained by the bearing cover 50 in the step actuator according to the embodiment, the second housing 120 and the mounting member 60 are not needed to restrain the bearing 40 in the specific position. Thus, the second housing 120 and the mounting member can be designed in various shapes.

FIGS. 8 to 12 are perspective views showing the structure and coupling relationship between the bearing cover and the mounting member.

Similar to the bearing cover 50 shown in FIGS. 6 and 7, the bearing cover 50 shown in FIGS. 8 to 12 is provided with the coupling section 54. The structure of the bearing cover 50 shown in FIGS. 8 to 12 is identical to the structure of the bearing cover 50 shown in FIGS. 1 to 5, except for the structure of the coupling section 54.

Figure 8:
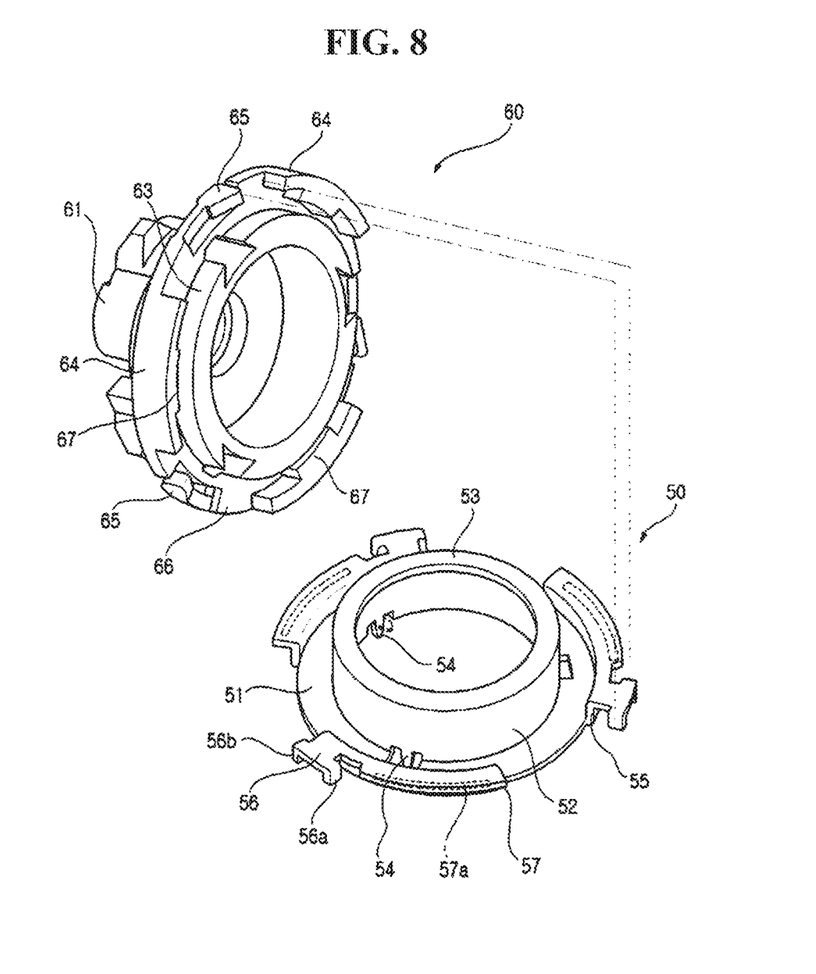
FIGS. 8 to 12 are perspective views showing the structure and coupling relationship between a bearing cover and a mounting member.

Referring to FIG. 8, the bearing cover 50 includes a coupling rim 51, a coupling pipe 52, a locking rim 53, a coupling section 54, a support member 55, a stopper protrusion 56 (which can be referred to as a stopper of the cover 50), and a first contact member 57. As seen in at least FIGS. 6 and 8, the stopper 56 of the cover 50 is disposed under the bearing 40.

The coupling rim 51 has a ring shape with a predetermined width and is coupled to the second rim section 122 of the second housing 120. For instance, the coupling rim 51 is coupled to the second rim section 122 of the second housing 120 through a welding.

The coupling pipe 52 extends in the second direction from an inner peripheral surface of the coupling rim 51 such that an inner circumferential surface of the coupling pipe 52 makes contact with an outer race of the bearing 40.

The locking rim 53 protrudes radially inward from a second end of the coupling pipe 52 to make contact with the outer race of the bearing 40. The locking rim 53 restrains the movement of the bearing 40 in the second direction.

As mentioned above, the coupling section 54 restrains the movement of the bearing 40 in the first direction. The coupling section 54 is vertically bent to support the bearing 40 and faces the locking rim 53 while interposing the bearing 40 therebetween.

A plurality of support members 55 extend from an outer peripheral portion of the coupling rim 51 in the second direction while being spaced apart from each other. A circular virtual line can be formed by connecting the support members 55.

The stopper protrusion 56 extends radially outward from the support member 55. The stopper protrusion 56 includes first and second bending members 56*a* and 56*b* which are arranged in the circumferential direction. The first and second bending members 56*a* and 56*b* are supported on a locking member 64 and the locking protrusion 65 of the mounting member 60 such that the mounting member 60 can be inhibited from rotating in the circumferential direction when the mounting member 60 is coupled with the bearing cover 50.

The first and second bending members 56*a* and 56*b* may enlarge the contact area of the stopper protrusion 56, so that the stopper protrusion 56 can be securely supported on the locking member 64 and the locking protrusion 65.

The first contact member 57 extends radially outward from the second end of the support member 55 and makes contact with the second contact member 67 of the mounting member 60 to inhibit the mounting member 60 from moving in the axial direction.

The mounting member 60 includes the protrusion 61, a receptacle pipe 63 (which can be referred to as a first support tube), the locking member 64, the locking protrusion 65, an extension rim 66 and the second contact member 67. As seen in at least FIGS. 1 and 8, a step structure is formed between the first support tube 63 and the second support tube 62.

The protrusion 61 and the receptacle pipe 63 forms a body of the mounting member 60. The protrusion 61 supports the screw member 10 such that the screw member 10 can move in the first or second direction, and the receptacle pipe 63 provides a space for installing the bearing 40 and the bearing cover 50. The protrusion 61 protrudes from the receptacle pipe 63 in the second direction.

The first end of the receptacle pipe 63 is inserted between the support member 55 of the bearing cover 50 and the coupling pipe 52. Thus, an outer peripheral portion of the first end of the receptacle pipe 63 makes contact with an inner peripheral portion of the support member 55 and an inner peripheral portion of the first end of the receptacle pipe 63 makes contact with an outer peripheral portion of the coupling pipe 52.

The extension rim 66 extends radially outward from an outer peripheral surface of the receptacle pipe 63. The extension rim 66 has a ring shape and faces the first stopper protrusion 56 and the first contact member 57 of the bearing cover 50.

A plurality of locking members 64 extend from the outer peripheral portion of the extension rim 66 in the first direction while being spaced apart from each other. An inner peripheral portion of the locking member 64 faces an outer peripheral portion of the coupling rim 51.

When the mounting member 60 rotates clockwise in a state in which the locking member 64 is positioned between the support members 55 of the bearing cover 50, the first bending member 56*a* makes contact with the circumferential end of the locking member 64. Thus, the mounting member 60 does not rotate clockwise any more.

The locking protrusion 65 has elasticity and is formed on the extension rim 66 between the locking members 64. The locking protrusion 65 has a shape of a cantilever having a free end making contact with the second bending member 56*b* of the stopper protrusion 56.

That is, the locking protrusion 65 is positioned between adjacent support members 55, and then is locked with the second bending member 56*b* of the stopper protrusion 56 while moving along the stopper protrusion 56 when the mounting member 60 rotates clockwise.

In order to allow the locking protrusion 65 to smoothly move along the stopper protrusion 56, the free end of the locking protrusion 65 is inclined.

The second contact member 67 extends radially inward from the first end of the locking member 64 while being spaced apart from the extension rim 66 by a predetermined distance. The first contact member 57 is inserted between the second contact member 67 and the extension rim 66.

The mounting member 60 coupled to the bearing cover 50 from the second direction. Thus, when the mounting member 60 is coupled to the bearing cover 50, the second contact member 67, which is integrally formed with the mounting member 60, is coupled to the first contact member 57, which is integrally formed with the bearing cover 50, from the first direction so that the movement of the mounting member 60 can be restrained in the first and second directions.

In order to securely couple the bearing cover 60 to the mounting member 60, an embossing 57*a* is formed on the first contact member 57 that makes contact with the second contact member 67. The embossing 57*a* adheres to the second contact member 67 when the locking member 64 and the locking protrusion 67 are locked with the stopper protrusion 56 due to the rotation of the mounting member 60, thereby supporting the second contact member 67 from the first direction.

Hereinafter, the method for coupling the mounting member 60 to the bearing cover 50 will be described with reference to FIGS. 9 to 12.

Figure 9:
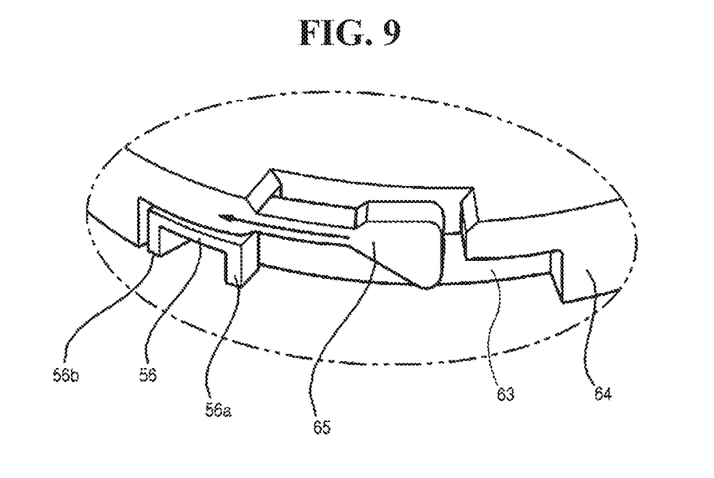

As shown in FIG. 9, the receptacle pipe 63 of the mounting member 60 is inserted between the support member 55 and the coupling pipe 52 of the bearing cover 50, and the locking member 64 and the locking protrusion 65 of the mounting member 60 are positioned between the stopper protrusions 56 of the bearing cover 50.

Figure 10:
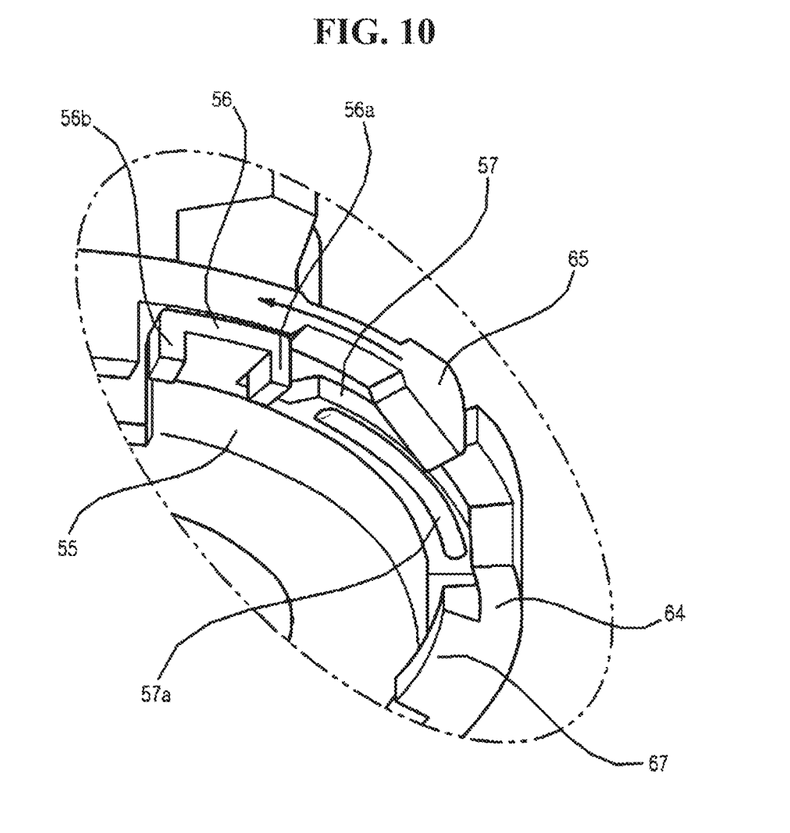

Differently from FIG. 10, the first contact member 57 of the bearing cover 50 does not overlap the second contact member 67 of the mounting member 60 in the axial direction in FIG. 9.

Figure 11:
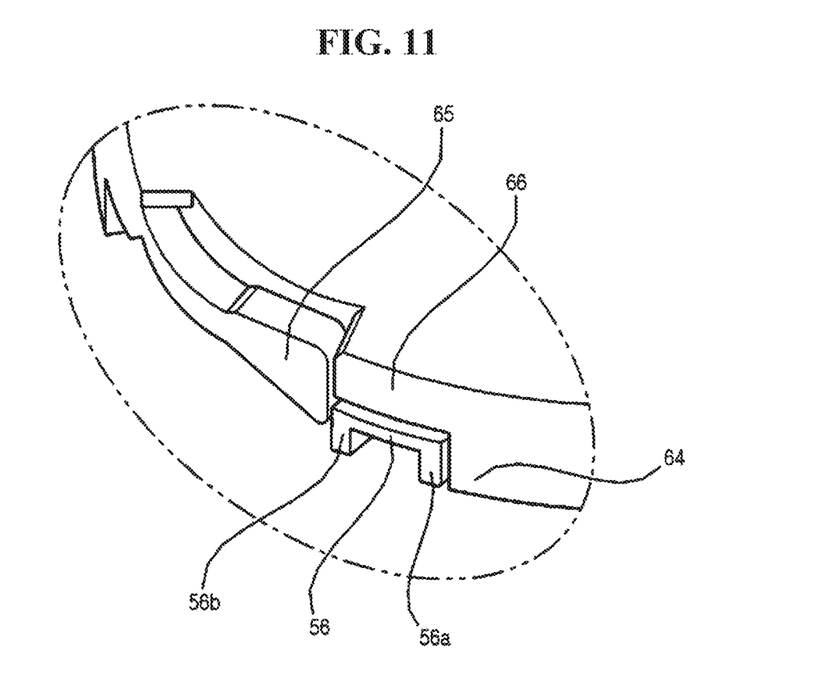

Referring to FIGS. 9 and 10, if the mounting member 60 rotates clockwise, as shown in FIG. 11, the locking member 64 makes contact with the first bending member 56*a*, and the locking protrusion 65 moves along the stopper protrusion 56 so that the free end of the locking protrusion 65 makes contact with the second bending member 56*b*. Thus, the mounting member 60 is not rotated.

Figure 12:
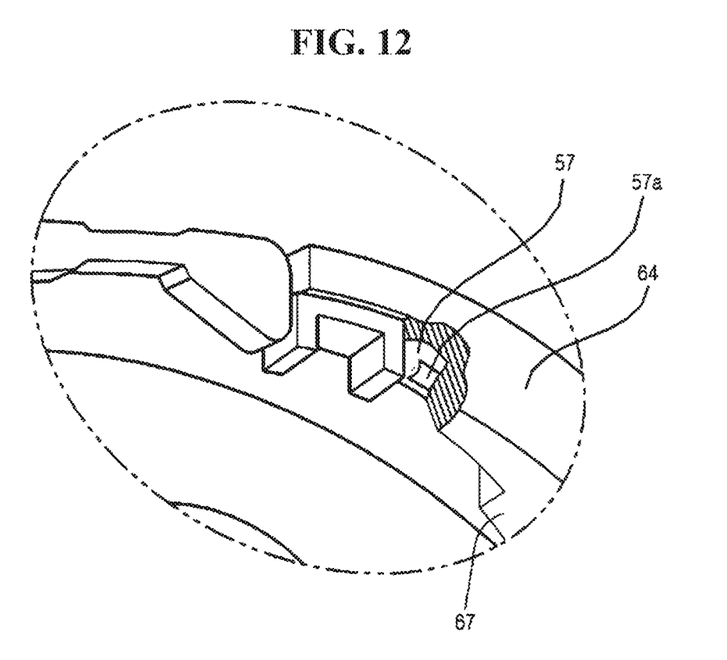

Similar to FIG. 12, the first contact member 57 of the bearing cover 50 overlaps the second contact member 67 of the mounting member 60 in the axial direction in FIG. 11. Thus, the first contact member 57 makes contact with the second contact member 67. Since the embossing 57*a* is formed on the first contact member 57, the embossing 57*a* adheres to the second contact member 67 while pushing the second contact member 67 in the first direction. Therefore, the bearing cover 50 can be securely coupled to the mounting member 60 without moving in the axial direction.

The mounting member 60 can be easily disassembled by rotating the mounting member 60 counterclockwise after lifting up the free end of the locking protrusion 165 in the second direction.

The step actuator according to the embodiment includes the bearing cover 50, which restrains the position of the bearing 40 and supports the mounting member 60, and the mounting member 60, which guides and supports the linear movement of the screw member 10. Thus, the mounting member 60 can be fabricated in various shapes and easily coupled with the bearing cover 50.

In the step actuator described above, an electric field is generated as power is applied to the first terminal section 135 and the second terminal section 145, so that the magnet 30 rotates in the forward direction or the backward direction according to the electric field.

As the magnet 30 rotates, the nut member 20 coupled with the magnet 30 also rotates, so that the screw member 10 having the thread 11 engaged with the thread of the nut member 20 moves in the first direction or the second direction according to the rotation direction of the magnet 30.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The step actuator according to the embodiment can convert the rotational movement into the linear movement, so the step actuator can be applied to various electric and mechanical devices requiring the linear action.

The invention claimed is:

1. A step actuator comprising:
a stator including a housing and a bobbin;
a rotor disposed in the stator and including a magnet and a motion transmission member;
a screw member coupled with the rotor;
a cover coupled to an upper side of the housing;
a bearing disposed between the motion transmission member and the cover; and
a bracket disposed on an upper side of the cover,
wherein the bracket includes a first support tube and a second support tube smaller than the first support tube,
wherein a first step structure is formed between the first support tube and the second support tube,
wherein the cover includes a coupling pipe disposed on a side of the bearing and a locking rim formed at an upper end of the coupling pipe,
wherein the coupling pipe is disposed in the first support tube, the coupling pipe and the locking rim are integrally formed, and the locking rim extends from an inner circumferential surface of the coupling pipe to an upper side of the bearing,
wherein an upper surface of the locking rim is in contact with the first step structure, and
wherein a lower surface of the locking rim is in contact with an upper surface of an outer ring of the bearing.

2. The step actuator as claimed in claim 1, wherein the motion transmission member is disposed between the screw member and the magnet,
wherein the motion transmission member includes a support frame formed on an outer circumferential surface of an upper end thereof and a second step structure formed on an outer circumferential surface of a central portion thereof, and
wherein the support frame of the motion transmission member is in contact with an upper surface of an inner ring of the bearing.

3. The step actuator as claimed in claim 2, wherein an outer peripheral surface of the motion transmission member is coupled to an inner peripheral surface of the magnet, and
wherein a thread is formed between the inner circumferential surface of the motion transmission member and an outer circumferential surface of the screw member.

4. The step actuator as claimed in claim 1, wherein the cover includes a coupling frame engaging the housing and a protrusion protruding from the coupling frame, and
wherein the protrusion is coupled to the bracket to inhibit rotation of the bracket.

5. The step actuator as claimed in claim 4, wherein the bracket is detachably coupled to the cover.

6. The step actuator as claimed in claim 4, wherein the coupling pipe is extended in a vertical direction from an inner peripheral surface of the coupling frame.

7. The step actuator as claimed in claim 1, wherein an outer circumferential surface of the coupling pipe is in contact with an inner circumferential surface of the first support tube.

8. A step actuator comprising:
a stator including a housing and a bobbin;
a rotor disposed in the stator and including a magnet and a motion transmission member;
a screw member coupled with the rotor;
a cover coupled to an upper side of the housing; and
a bearing disposed between the motion transmission member and the cover;
wherein the motion transmission member includes a support frame formed on an outer circumferential surface of an upper end thereof and a step structure formed on an outer circumferential surface of a central portion thereof,
wherein the cover includes a locking rim disposed on a side of the bearing, and a stopper disposed under the bearing, and
wherein an outer ring of the bearing is disposed between the locking rim and the stopper of the cover.

9. The step actuator as claimed in claim 8, wherein a thread is formed in a portion of a lower portion of the step structure of the motion transfer member, and
wherein an inner circumferential surface of a region where the thread is formed in the motion transmission member is smaller than a diameter of the inner circumferential surface of the region without the thread.

10. The step actuator as claimed in claim 8, wherein the cover includes a coupling pipe disposed on a side of the bearing, and
wherein the locking rim, the coupling pipe, and the stopper are in contact with the bearing.

11. The step actuator as claimed in claim 8, wherein at least two stoppers are disposed under the bearing, and
wherein the stoppers contact a lower surface of the bearing.

12. A step actuator comprising:
a stator including a housing and a bobbin;
a rotor disposed in the stator and including a magnet and a motion transmission member;
a screw member coupled with the rotor;
a cover coupled with the housing;
a bearing disposed between the motion transmission member and the cover; and
a bracket disposed on the cover;

wherein the bracket includes a first support tube and a second support tube smaller than the first support tube, wherein a first step structure is formed between the first support tube and the second support tube, wherein the cover includes a coupling frame, a coupling pipe extending from the coupling frame, and a locking rim formed at an upper end of the coupling pipe, wherein the coupling pipe is disposed in the first support tube, wherein the locking rim is arranged to correspond to the first step structure, wherein the coupling tube and the locking rim are integrally formed, and the locking rim extends from an inner circumferential surface of the coupling tube to an upper side of the bearing, wherein an upper surface of the locking rim is in contact with the first step structure, and a lower surface of the locking rim is in contact with an upper surface of an outer ring of the bearing, wherein the cover includes a protrusion protruding from the coupling frame, and wherein the protrusion is coupled to the bracket to inhibit rotation of the bracket.

13. The step actuator as claimed in claim 12, wherein the motion transmission member is disposed between the screw member and the magnet, wherein the motion transmission member includes a support frame formed on an outer circumferential surface of an upper end thereof and a second step structure formed on an outer circumferential surface of a central portion thereof, and wherein the support frame of the motion transmission member is in contact with an upper surface of an inner ring of the bearing.

14. The step actuator as claimed in claim 12, wherein the bracket is detachably coupled to the cover.

15. A step actuator comprising:

a stator including a housing and a bobbin;

a rotor disposed in the stator and including a magnet and a motion transmission member;

a screw member coupled with the rotor;

a cover coupled to an upper side of the housing; and a bearing disposed between the motion transmission member and the cover;

wherein the motion transmission member includes a support frame formed on an outer circumferential surface of an upper end thereof and a second step structure formed on an outer circumferential surface of a central portion thereof, wherein the cover comprises a coupling frame, a coupling pipe extending from the coupling frame, a locking rim formed at an upper end of the coupling pipe, and a stopper disposed under the bearing, and wherein an outer ring of the bearing is disposed between the locking rim and the stopper of the cover.

* * * * *